United States Patent [19]  [11] 3,979,142
Fujisawa  [45] Sept. 7, 1976

[54] ABRASION RESISTING FLEXIBLE JOINT PIPE

[75] Inventor: Masao Fujisawa, Chigasaki, Japan

[73] Assignee: Bridgestone Tire Company Limited, Tokyo, Japan

[22] Filed: Dec. 17, 1974

[21] Appl. No.: 533,592

[30] Foreign Application Priority Data

Dec. 21, 1973 Japan............................ 48-142498
Dec. 21, 1973 Japan............................ 48-142499

[52] U.S. Cl................................. 285/235; 285/423
[51] Int. Cl.²........................................ F16L 21/00
[58] Field of Search .............. 285/235, 49, 229, 53, 285/261, DIG. 20, 423, 72; 138/109, 124–127, 129–138; 156/272, 175

[56] References Cited

UNITED STATES PATENTS

| | | | |
|---|---|---|---|
| 1,230,867 | 6/1917 | Cobb | 138/126 |
| 3,613,736 | 10/1971 | Kuwahara | 285/149 X |
| 3,765,979 | 10/1973 | Thomas | 285/423 |
| 3,814,468 | 6/1974 | Mauramatsu | 285/235 |

FOREIGN PATENTS OR APPLICATIONS

| | | | |
|---|---|---|---|
| 1,554,897 | 12/1968 | France | 285/49 |
| 1,150,700 | 8/1957 | France | 156/172 |
| 102,520 | 8/1962 | Netherlands | 285/423 |

Primary Examiner—Dave W. Arola
Attorney, Agent, or Firm—Sughrue, Rothwell, Mion, Zinn and Macpeak

[57] ABSTRACT

An abrasion resisting flexible joint pipe is disclosed which is adapted to flexibly holding together opposed end tubes made of rigid material and transferring mud or sand removed as by dredging and comprises a pair of opposed end tubes, an elastic rubber body flexibly holding together the opposed end tubes and defined by a cylindrical inner rubber surface and a spherical shell-shaped outer rubber surface, and a spherical shell-shaped reinforcing layer embedded in the elastic rubber body. The abrasion resisting flexible joint pipe satisfies the condition given by $$l < 0.68d$$

where $l$ is the distance between the opposed end tubes and $d$ is the inner diameter of the end tubes. Two embodiments of the joint pipe are provided. The corresponding outer rubber surface and reinforcing layer in these two embodiments are also spherical shell in shape, but the following conditions are further satisfied in order to improve the abrasion and pressure resisting properties of the joint pipe, respectively.

$$R \leqq 10d$$

where $R$ is the radius of curvature of the spherical shell-shaped outer rubber surface of the reinforcing layer.

$$\beta < 35°$$

where $\beta$ is the angle formed between the rubberized cords of the reinforcing layer and the common center axis of the end tubes.

3 Claims, 8 Drawing Figures

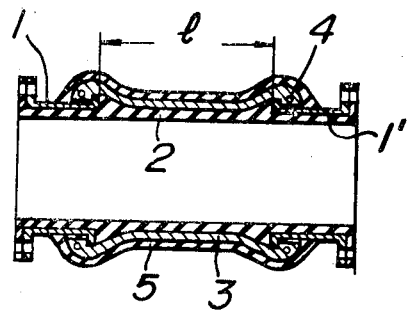
FIG_1
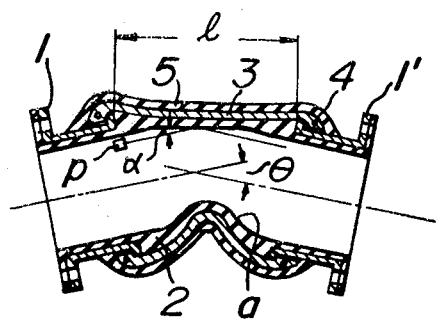
FIG_2
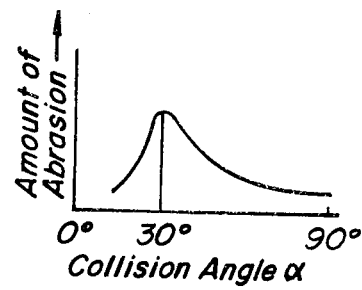
FIG_3

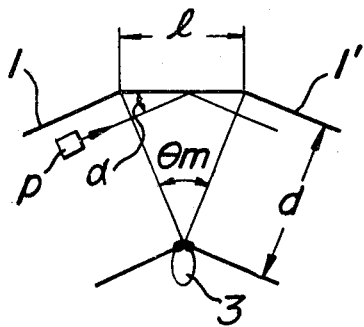
FIG_4
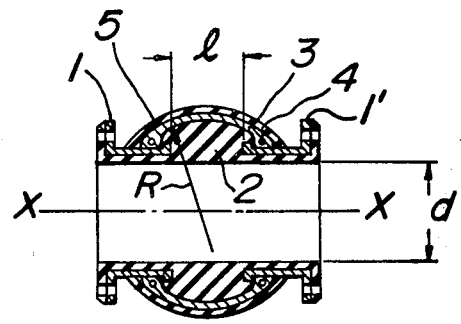
FIG_5
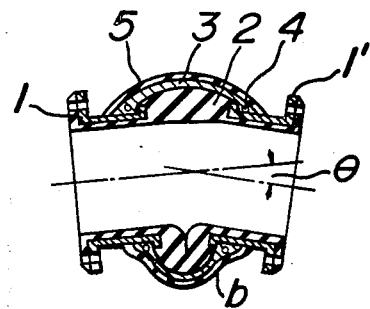
FIG_6

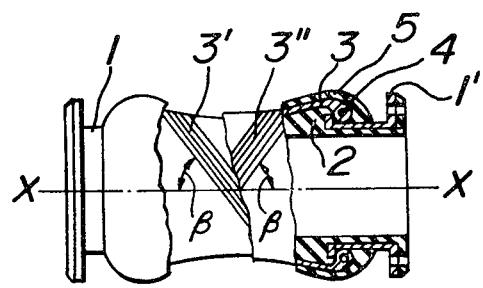
FIG_7
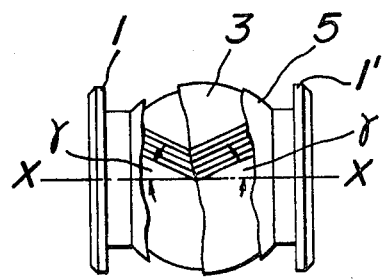
FIG_8

3,979,142

ABRASION RESISTING FLEXIBLE JOINT PIPE

BACKGROUND OF THE INVENTION

This invention relates to an abrasion resisting flexible joint pipe.

Such kind of joint pipe has heretofore been used for flexibly connecting opposed end tubes made of rigid material such as metal and the like and adapted to transfer mud or sand removed as by dredging.

As shown in FIG. 1, a prior art flexible joint pipe comprises an elastic rubber body whose length $l$, that is, a distance between opposed end tubes 1, 1', is made considerably long for the purpose of easily deforming the elastic rubber body. As a result, if the elastic rubber body is bent as shown in FIG. 2, a bending angle $\theta$ formed by the intersection of two center axes of the opposed end tubes 1, 1' becomes large and a sharp body such as crushed stone and the like contained in fluid to be transferred collides with the cylindrical inner rubber surface 2 of the elastic rubber body in a direction inclined from the cylindrical inner rubber surface 2 by an angle $\alpha$ which is approximately one half the bending angle $\theta$, thereby considerably wearing away the elastic rubber body by friction. In FIG. 1, reference numeral 3 designates a cylindrical reinforcing layer composed of at least two rubberized cord fabrics arranged so that parallel rubberized cords 3', 3'' (FIG. 7) run in opposite directions, making an angle $\beta$ with a common center axis $x-x$ of the opposed end tubes 1, 1', 4 a wire firmly binding each end of the reinforcing layer 3 about the opposed end tubes 1, 1', and 5 a cylindrical outer rubber surface of the elastic rubber body. The inner and outer rubber surfaces 2 and 5 are made integral with each other to form the elastic rubber body with the reinforcing layer 3 embedded therein.

Experimental tests have yielded the result that the amount of abrasion becomes maximum when the collision angle $\alpha$ arrives at 30° as shown in FIG. 3 which graphically illustrates the relation between the collision angle $\alpha$ and the amount of abrasion of the flexible joint pipe.

SUMMARY OF THE INVENTION

An object of the invention is to provide an abrasion resisting flexible joint pipe which can make the amount of abrasion by collision as small as possible.

Another object of the invention is to provide an abrasion resisting flexible joint pipe which can withstand a high internal pressure.

A feature of the invention is the provision of an abrasion resisting flexible joint pipe comprising a pair of opposed end tubes spaced apart from each other and having a common center axis, an elastic rubber body extending across said end tubes and defined by a cylindrical inner rubber surface and a spherical shell-shaped outer rubber surface, and a reinforcing layer composed of at least two rubberized fabrics arranged so that parallel rubberized cords run on a bias and in opposite directions, said flexible joint pipe satisfying the condition $$l < 0.68d$$

where $l$ is the distance between the opposed end tubes and $d$ is the inner diameter of each of the opposed end tubes.

BRIEF DESCRIPTION OF THE DRAWINGS

The invention will now be described in greater detail with reference to the accompanying drawings, wherein:

FIG. 1 is a cross-sectional view of a conventional flexible joint pipe;

FIG. 2 is a cross-sectional view similar to that of FIG. 1 illustrating the relation between deformation of the elastic rubber body due to bending and the collision angle;

FIG. 3 is a graph which illustrates the relation between the collision angle $\alpha$ and the amount of abrasion;

FIG. 4 is a diagram for explaining the principle of the flexible joint pipe according to the invention;

FIG. 5 is a cross-sectional view showing one embodiment of the flexible joint pipe according to the invention;

FIG. 6 is a cross-sectional view similar to that of FIG. 5, but showing the state after the flexible joint pipe has been bent;

FIG. 7 is a front elevation of the conventional flexible joint pipe shown in FIG. 1 partly broken away and partly shown in section; and FIG. 8 is a front elevation showing another embodiment of the flexible joint pipe according to the invention partly broken away.

DESCRIPTION OF THE PREFERRED EMBODIMENTS

Referring now to FIG. 4, explaining the principle of the flexible joint pipe according to the invention in the maximum bent condition thereof will be explained. Let $d$ be the inner diameter of a pair of opposed end tubes 1, 1', $l$ be the distance between the opposed end tubes 1, 1'', $\theta m$ be the maximum bending angle formed by the intersection of the opposed end surfaces of the end tubes 1, 1', and $\alpha$ be the collision angle formed by the direction of movement of an object P to be transferred when it collides with the cylindrical inner rubber surface of the flexible joint pipe, then the following relations are given:

$$\frac{\theta m}{2} = \alpha \quad (1)$$

$$\frac{l/2}{d} = \sin \frac{\theta m}{2} \quad (2)$$

If the collision angle $\alpha$ should be smaller than 20°, then the following condition must be satisfied $$l/d < 0.68 \quad (3)$$
since $\sin 20° = 0.342$.

As a result, if the distance $l$ between the opposed end tubes 1, 1' and the inner diameter $d$ of the end tubes 1, 1' satisfy the above equation (3), it is possible to make the collision angle $\alpha$ not greater than 20° and hence the collision angle $\alpha$ does not arrive at 30° at which the amount of abrasion is maximum.

In FIG. 5 is shown one embodiment of the flexible joint pipe according to the invention. Reference numeral 1, 1' designate a pair of opposed end tubes, 2 a cylindrical inner rubber surface, 3 a spherical shell-shaped reinforcing layer, 4 a wire for firmly binding each end of the reinforcing layer 3 about the end tubes 1, 1', and 5 a spherical shell-shaped outer rubber surface. The cylindrical inner rubber surface 2 and the spherical shell-shaped outer rubber surface 5 are made integral with each other to form an elastic rubber body.

As above described, the prior art flexible joint pipe shown in FIG. 1 comprises a cylindrical elastic rubber body including a cylindrical reinforcing layer 3 embedded therein. The distance *l* between the opposed end tubes 1, 1' of such flexible joint pipe may also be made short according to the above described principle. But if such short flexible joint pipe is bent, the compressed side of the flexible rubber body is inwardly folded to form a protrusion *a* which deforms the fluid flow path as shown in FIG. 2. As a result, the protrusion *a* obstructs the fluid flow path and causes the inner rubber surface 2 to be locally worn away.

The invention is based on the recognition that occurrence of the inwardly folded protrusion *a* can be avoided by making both the outer rubber surface 5 of the flexible rubber body extending across the opposed end tubes 1, 1' and the reinforcing layer 3 embedded therein a spherical shell in shape and by making these spherical shell-shaped outer rubber surface 5 and reinforcing layer 3 together with the cylindrical inner rubber surface 2 integral with the opposed end tubes 1, 1'.

The spherical shell-shaped reinforcing layer 3 is required to be deformed so that the compressed side of the flexible rubber body is outwardly protruded as shown by *b* in FIG. 6 when the flexible joint pipe is bent, thereby obviating a significant curvature or restriction of the fluid flow path.

Experimentation has shown that substantially no such significant curvature or restriction of the fluid flow path occurs if the radius of curvature R of the spherical shell-shaped reinforcing layer 3 in a sectional plane inclusive of the common center axis $x$—$x$ of the opposed end tubes 1, 1' satisfies the condition given by $$R \leq 10d.$$

In the specification, the term "spherical shell-shaped" shall be understood to include either a completely spherical shell-shaped surface or a convex shell-shaped surface generated by a convex curve which is rotated about the common center axis $x$—$x$ of the opposed end tubes 1, 1'.

As seen from FIG. 6, the abrasion resisting flexible joint pipe according to the invention can prevent the inner rubber surface 2 of the elastic rubber body from being inwardly protruded by the presence of the spherical shell-shaped outer rubber surface 5 and reinforcing layer 3 when the flexible joint pipe is bent and the collision angle $\alpha$ of the body to be transferred *p* can always be maintained at an angle which is smaller than 20°, thereby significantly improving the abrasion resisting property of the inner rubber surface of the elastic rubber body.

As explained hereinbefore, the use of the measures described ensures efficacious limitation of the bending angle $\theta$ of an abrasion resisting flexible joint pipe and provides the important advantage that the inner rubber surface 2 of the elastic rubber body is effectively prevented from being locally worn away by decreasing the collision angle $\alpha$ of the body to be transferred *p*, thereby providing a highly durable flexible joint pipe.

As shown in FIG. 7, the prior art flexible joint pipe as above described comprises opposed end tubes 1, 1', an elastic rubber body extending across and holding together the opposed end tubes 1', 1' and including cylindrical inner and outer rubber surfaces 2, 5 made integral with each other to form the elastic rubber body, and a cylindrical reinforcing layer 3 composed of at least two rubberized cord fabrics arranged so that the cords 3', 3'' of the fabrics run in opposite directions, making an angle $\beta$ which is about 55° with a common center axis $x$—$x$ of the opposed end tubes 1, 1' and firmly bound at each end about the opposed end tubes 1, 1' by means of wires 4. As above described, both the outer rubber surface 5 and the reinforcing layer 3 may be made substantially spherical shell in shape for the purpose of preventing the compressed side of the resilient rubber body from being inwardly folded to form a protrusion *a* when the flexible joint pipe is bent.

In this case, however, the maximum diameter of the spherical shell-shaped reinforcing layer 3 becomes far greater than the diameter of the prior art cylindrical reinforcing layer, and as a result, the pressure resisting force of the flexible joint pipe becomes degraded.

In accordance with the invention, in order to avoid such disadvantage the angle $\beta$ of rubberized cords inclined from the common center axis $x$—$x$ of the end tubes is made smaller than 35°.

The use of such measure ensures increase of the pressure resisting force of the flexible joint pipe at least two times larger than that of the spherical shell-shaped reinforcing layer whose cord angle is on the order of 55°.

Let

*t* be the tensile strength per unit width of the rubberized cord fabric,

*d'* be the average diameter of the reinforcing layer composed of at least two rubberized cord fabrics, and $\beta$ be the angle of the cord inclined from the common center axis of the end tubes (cord angle), then the strength L of the reinforcing layer in the lengthwise direction of the flexible joint pipe is given by $$L = t\pi d' \cos^2\beta$$

and the strength $R$ of the reinforcing layer in the circumferential direction of the flexible joint pipe is given by $$R = t\pi d' \sin\beta \cos\beta.$$

In this case, it is possible to shorten the elastic rubber body located between the end tubes 1, 1'. As a result, the strength R of the reinforcing layer in the circumferential direction of the flexible joint pipe subjected to the inner pressure due to the fluid flow through the flexible joint pipe can be supported by the opposed end tubes 1, 1' made of metal. Thus, only the strength L of the reinforcing layer in the lengthwise direction of the flexible joint pipe can be taken into consideration. Hence, the cord angle $\beta$ which is sufficient to produce the strength L of the reinforcing layer in the lengthwise direction of the flexible joint pipe which is at least two times larger than that produced when the cord angle $\beta$ is 55° is given by $$2t\pi d' \cos^2 55° < t\pi d' \cos^2\beta$$

Hence $$\beta < 35°.$$

As seen from the above, the use of the arrangement of the rubberized cords inclined from the common center axis $x$—$x$ by smaller than 35° ensures pressure resisting force of the flexible joint pipe which is at least two times higher than that of the prior art flexible joint pipe.

Experimental tests have yielded the surprising result that the pressure resisting force of another embodiment of the abrasion resisting flexible joint pipe according to the invention having a cord angle $\gamma$ on the order of 35° as shown in FIG. 8 is not decreased, even though its reinforcing layer 3 is made to be a spherical shell in shape. In this case, the radius of curvature R of the spherical shell-shaped reinforcing layer 3 in a sectional plane inclusive of the common center axis $x$—$x$ of the end tubes 1, 1' must also satisfy the condition given by $$R \leq 10d.$$

As stated hereinbefore, the invention is capable of effectively preventing formation of an inward protrusion of the elastic rubber body by inwardly folding it when the abrasion resisting flexible joint pipe is bent, and hence of preventing local abrasion, reduction or close of the fluid flow path and hence of increasing durability of the flexible joint pipe without decreasing the pressure resisting force. In addition, the invention makes it possible to attain the above effect without increasing the number of rubberized cords and eventually the number of rubberized cords can even be decrased.

What is claimed is:

1. An abrasion resisting joint pipe comprising a pair of opposed end tubes separated from each other and aligned with a common center axis, an elastic rubber body extending across and flexibly holding together said end tubes and defined by a cylindrical inner rubber surface and a spherical shell-shaped outer rubber surface, and a spherical shell-shaped reinforcing layer comprised of at least two rubberized cord fabrics embedded in said elastic rubber body and bound at each end about said end tubes, said flexible joint pipe satisfying the condition given by $$l < 0.68d$$

where $l$ is the distance between said opposed end tubes and $d$ is the inner diameter of said end tube.

2. An abrasion resisting flexible joint pipe as claimed in claim 1, wherein the radius of curvature R of the spherical shell-shaped outer rubber surface of said reinforcing layer in a sectional plane inclusive of said common center axis of said opposed end tubes satisfies the condition given by $$R \leq 10d.$$

3. An abrasion resisting flexible joint pipe as claimed in claim 1, wherein the rubberized cords of said reinforcing layer are inclined from said common center axis of said end tubes by an angle $\beta$ which is smaller than 35°.

* * * * *